United States Patent
Siebke

(10) Patent No.: US 7,114,597 B2
(45) Date of Patent: Oct. 3, 2006

(54) SPRING LOADED CYLINDER

(75) Inventor: Alf Siebke, Munich (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 74 days.

(21) Appl. No.: 10/813,134

(22) Filed: Mar. 31, 2004

(65) Prior Publication Data

US 2004/0182659 A1 Sep. 23, 2004

Related U.S. Application Data

(63) Continuation of application No. PCT/EP02/10854, filed on Sep. 27, 2002.

(30) Foreign Application Priority Data

| Oct. 1, 2001 | (DE) | ................................ 101 48 479 |
| Aug. 12, 2002 | (DE) | ................................ 102 36 923 |

(51) Int. Cl.
   *F16D 66/00* (2006.01)
(52) U.S. Cl. .................. 188/1.11 E; 188/170
(58) Field of Classification Search ................ 188/166, 188/167, 170, 1.11 E; 11/11
   See application file for complete search history.

(56) References Cited

U.S. PATENT DOCUMENTS

| 3,926,094 | A | * | 12/1975 | Kurichh et al. ................. 92/63 |
| 4,796,513 | A |   | 1/1989 | Hata et al. |
| 5,572,187 | A |   | 11/1996 | Williford |
| 5,753,807 | A | * | 5/1998 | Trueman et al. ............... 73/121 |
| 5,816,371 | A |   | 10/1998 | Buckley et al. |
| 5,825,287 | A | * | 10/1998 | Zarybnicky et al. ........ 340/453 |
| 6,255,941 | B1 | * | 7/2001 | Osterman et al. ........... 340/479 |
| 6,311,804 | B1 | * | 11/2001 | Baalmann et al. ...... 188/1.11 L |
| 6,480,107 | B1 | * | 11/2002 | Stonehocker et al. ....... 340/479 |
| 2004/0060784 | A1 | * | 4/2004 | Gravier ...................... 188/170 |

FOREIGN PATENT DOCUMENTS

| DE | 28 46 652 | 5/1980 |
| DE | 32 47 210 | 7/1984 |
| DE | 38 36 080 | 4/1990 |
| DE | 44 09 351 | 9/1995 |
| DE | 44 09 351 A1 | 9/1995 |
| FR | 2766534 | 1/1999 |

(Continued)

OTHER PUBLICATIONS

International Search Report.
WABCO Letter of Nov. 29, 2004 to Deutsches Patent-und Markenamt, pp. 1-6.

*Primary Examiner*—Devon C. Kramer
(74) *Attorney, Agent, or Firm*—Crowell & Moring LLP

(57) ABSTRACT

A spring storage cylinder, for the generation of braking forces for the auxiliary and parking brake effect, comprises a piston, arranged in a housing, which may be displaced for the operation of a brake lever. The piston is pretensioned against the brake lever by a spring. A release spindle is provided, by which the piston may be moved from an extended position, operating the brake lever, in the braking position, against the force of a spring into a withdrawn position, releasing the brake. A primary chamber is provided in the housing, pressurized to a certain pressure, in which, when an operating pressure is exceeded, the piston is moved into the withdrawn position against the pressure of the spring. At least one contact switch is provided to determine the position of the piston in the housing. The operating status of the spring storage cylinder may be monitored by the contact switch(es), the storage function and the release function controlled and any damage to the storage spring determined.

24 Claims, 3 Drawing Sheets

FOREIGN PATENT DOCUMENTS

WO    WO 97/20153    *    6/1997

WO    WO 98/37338    8/1998

* cited by examiner

SPRING LOADED CYLINDER

CROSS-REFERENCE TO RELATED APPLICATIONS

This application is a continuation of PCT Application No. PCT/EP02/10854 filed on Sep. 27, 2002.

BACKGROUND AND SUMMARY OF THE INVENTION

The present invention relates to a spring-loaded cylinder which permits the detection of the emergency braking and parking braking functions.

Spring-loaded cylinders for generating an emergency braking or parking braking function are known, which cylinders are released in the driving operation and, in the parking mode, act by means of a spring upon a brake lever for securing the vehicle in its parked position. The released position is achieved as soon as the pneumatic pressure in a primary chamber of the spring accumulator has displaced the spring-loaded piston against the force of the pre-loaded spring into the withdrawn position. The working stroke required for securing the vehicle in its position is triggered by the pressure drop in the primary chamber of the spring accumulator until, as a result of the excess force of the pre-loaded spring, the spring-loaded piston starts to move and carries out its working stroke. A possibly remaining pressure in the primary chamber and the reaction force of the brake itself act against the working stroke.

Such a spring-loaded cylinder also comprises a release screw so that, in the event of an energy loss of the pneumatic brake system, a release of the spring accumulator can take place. The release screw can be operated in order to move the piston into a withdrawn position for releasing the brake lever. When the release screw, as the emergency release device, renders the parking brake or emergency brake system ineffective, this has to be visually noticeable, so that the driver or the shop personnel can recognize the respective operating condition.

In the case of the known spring-loaded cylinders, the release screw projects out of the spring-loaded housing in the emergency release condition, or a pin connected with the release screw moves out of the housing. As a result, the operating condition of the emergency release device can be recognized from the outside. However, the visual checking of the operating condition is disadvantageous because, in view of the small installation spaces, the checking is relatively difficult, and the operating condition may be judged incorrectly by the observer.

In addition, up to six spring accumulators are situated at the vehicle, so that performing a visual check requires considerable time. Also, the release screw can only be screwed partially out of the spring-loaded housing. The resulting intermediate position is undefined and may be overlooked or interpreted incorrectly. An emergency release system operated in this manner may reduce the parking braking and emergency braking function, because the working stroke of the piston is limited.

For a secure and economical operation of the vehicle, the driver requires information concerning the actual operating position of the parking brake at any time. This is important when the vehicle is started with empty air reservoirs, because a driving start should not take place before the parking brake is released. Also, a possible defect of the parking brake system, for example, as a result of a loss of pressure, should be immediately detectable, so that an uncontrolled braking operation by means of the parking brake while driving is prevented.

The reaching of the release position of the spring-loaded cylinder is usually indirectly ensured by the control of the pressure in the primary chamber, in that a pressure switch responds at a defined release pressure and extinguishes a warning light in the dashboard. At a full operating pressure, the spring-loaded piston is pressed against the effect of the spring into the withdrawn position in stroke position 0. The extinguishing of the warning light in the dashboard takes place by the pressure switch, whose switching pressure is defined to a certain value which is above the actual release pressure of the spring-loaded cylinder. This is a result of the fact that the release pressure has considerable tolerances because of the relatively high force output tolerances of the pre-loaded spring caused by the manufacturing and other factors, such as changed friction forces at the dynamic seals of the spring-loaded piston as well as a drop of force because of relaxation. These influences have the effect that the stroke of the piston acts differently at the same pneumatic pressure. The release position can therefore not be clearly assigned to a precise operating pressure. On the contrary, these influences have to be taken into account when defining the switching pressure of the pressure switch, so that, also when the tolerance situation is unfavorable, the switching signal will not be triggered too early.

However, as a result, the switch as a rule triggers the signal too late; that is, after the release position of the spring-loaded piston has been reached, which leads to a loss of time which, although not necessary, delays the driving readiness of the vehicle for the driver. Inversely, when the parking brake is activated, the warning light function occurs unnecessarily early because, when the pressure controlled-signal is triggered, the spring-loaded piston has not yet been moved. The use of a pressure switch in the case of a spring-loaded cylinder also has the disadvantage that the spring-loaded cylinder is always pressurized with the full operating pressure, for example, 8 bar, while for the release, the release pressure of, for example, 5.1 bar is sufficient. The energy, which is required for generating the pressure difference, remains completely unutilized and increases the energy consumption of the vehicle. This is particularly important when the parking brake system is used frequently, as, for example, in the case of vehicles in distributor traffic situations. Furthermore, time is lost until the emergency braking or parking braking becomes effective because first the differential pressure between the operating pressure and the release pressure has to be reduced before the start of the working movement of the spring-loaded piston.

It is therefore an object of the present invention to create a spring-loaded cylinder of the above-mentioned type which avoids the above-mentioned disadvantages and permits a simple and fast detection of the operating condition of the emergency or parking brake.

This object is achieved by a spring-loaded cylinder for generating braking forces for the emergency braking and parking braking effect, having (a) a piston arranged in a housing which can be moved for operating a brake lever, and which is pretensioned by way of a spring toward the brake lever, (b) a release screw, by which the piston can be moved from an extended position operating the brake lever in the braking position against the force of the spring into a withdrawn position releasing the brake, and (c) a primary chamber, which is arranged in the housing and can be acted upon by pressure and in which, when a response pressure of the piston is exceeded, is moved against the force of the spring into the withdrawn position. For detecting the position of the piston in the housing, at least one contact switch is provided between the release screw and the piston.

According to the invention, for detecting the position of the piston in the housing, at least one contact switch is provided so that the operating position of the spring-loaded cylinder can be monitored. As a result, the usual control of the spring-loaded cylinder by the use of pneumatic pressure, which has considerable tolerances, is eliminated because the position of the spring-loaded piston to be sensed is not detected indirectly, but rather directly. This leads to a clearly earlier triggering of the signal, which can indicate the driving readiness of the vehicle to the driver at the earliest possible point in time. When the parking brake is activated and the pressure in the spring-loaded cylinder is therefore decreased, a signal is generated which, in turn, switches on the warning light and thus draws the driver's attention to the engaged parking brake. When a defect is present in the system, for example, because of a leakage in the compressed-air system, a broken accumulator spring or because of another circumstance, the defective condition can be directly detected by means of the contact switch and a corresponding warning light can be switched on in the dashboard.

It is also possible to carry out a matching of the signals of the individual pre-loaded cylinders in order to permit an indirect detection of defects. Normally, several spring-loaded cylinders are used on a vehicle, which cylinders have approximately the same switching times. If considerable differences exist here with respect to the switching time, which can no longer be explained by normal deviations in the release time caused by tolerances, a warning signal may be emitted. This possibility of the mutual controlling of the individual spring-loaded cylinders is of great significance for traffic safety. When the emergency brake is used, a pre-loaded spring, which has a reduced effect, or a reduced braking effect may result in a critical brake pull of the vehicle, or the parking braking function may be reduced in an unacceptable manner. These problems have to be immediately detected and indicated by the control system of the vehicle, which was not possible by means of the previous manual testing methods.

According to a preferred embodiment of the invention, a contact switch is provided between the release screw and the piston. As soon as the piston is moved into the stop position and rests mechanically against the cylinder bottom, a circuit is switched in the contact switch. As a result, by the use of the contact switch, the operating condition of the spring-loaded cylinder can be detected when the piston is in the completely withdrawn position and the brake is in the unbraked condition. Thus, by means of the contact switch, the above-described warning light can be extinguished in the dashboard. In comparison to the control by the use of a pressure switch, a clearly earlier triggering of the signal is achieved because the end position of the spring-loaded piston to be sensed is detected directly.

When the contact switch is provided between the release screw or a release screw head and the piston for detecting the withdrawn position, a moving piston can be detected, for example, on the basis of a leakage in the compressed-air system. This type of a malfunctioning could previously only be indicated by way of the warning light when the operating pressure had fallen below the release pressure in the parking brake system and the pressure switch could therefore respond. In a different typical case of leakiness at the seal of the spring-loaded piston, compressed air can enter into the spring chamber of the spring-loaded cylinder and cause a pressure buildup there which supports the spring force and, starting at a certain pressure level, causes the spring-loaded piston to move. As long as the operating pressure in the parking brake system does not fall below the release pressure as a result of this leakage, however, the pressure switch will trigger no signal. Under corresponding conditions, the entire process may occur in an incremental manner, so that the release play of the brake is used up without being noticed by the driver and the brake may overheat. Such defects may result in a vehicle fire and represent a great risk to the driver and other traffic participants.

In addition, there are situations in which the release screw is operated for moving the piston into the withdrawn position and thereby activate the emergency release function. As a result, the contact switch is no longer activated even if the piston is arranged in the withdrawn position. Therefore, a warning light may be switched on or remain switched on which indicates a fully activated or partially activated emergency release mechanism. This is important for the driver because an adjusted release screw, corresponding to its function, completely or partially limits the stroke of the spring-loaded piston, whereby the parking brake is completely or partially rendered inoperative.

In a similar manner, a release screw can be detected which has become loose in the driving operation and is unintentionally unscrewed from the cylinder body. A release screw is also detected in this manner which is not completely screwed back in, for example, after a vehicle repair, because the warning light is not extinguished when the parking brake system is released pneumatically. This is also particularly important because the threaded connection of the release screw in the cylinder body has a sealing effect only in the completely screwed-in condition. Without any sealing effect at this point, moisture and dirt would penetrate into the spring chamber by way of the backlash of threads and cause corrosion or leakiness which may extend to the failure of the emergency braking and parking braking function.

The contact switch thereby contributes to the increase of the operating reliability of the brake system and thus to improving traffic safety in general.

Furthermore, beyond the actuating of the warning light, the signal of the contact switch can be used for control purposes in the brake system. For example, the electrical signal triggered with the reaching of the release position of the spring-loaded piston can be used for controlling the relay valve connected in front of the spring-loaded cylinder in the parking brake system.

In conventional systems, the spring-loaded cylinders are pressurized with the full available operating pressure for releasing the parking brake, which operating pressure is normally 35 to 50% above the release pressure. The suggested switching-off of the relay valve is to take place when the release position of the spring-loaded piston has been reached. For this purpose, a relay valve has to be present, which is either directly controlled electrically or is controlled pneumatically by way of electrically switched solenoid valves. By means of the signal of the switch, the relay valve is controlled such that a further pressure buildup in the spring-loaded cylinder will not take place. As a result, on the one hand, the energy is saved for generating the air volume additionally pressurized at the full operating pressure, which air volume is required for raising the pressure in the spring-loaded cylinder from the release pressure to the full operating pressure. On the other hand, generally the air consumption of the spring-loaded cylinders is reduced by the described volume during each actuation. Since, according to the legal provisions, the air reservoir of the spring-loaded brake system has to be dimensioned as a defined function of the required compressed-air volume of the parking brake system, this advantage of the suggested device permits a reduction of the size, cost and weight of the air reservoir with the accompanying gain of space.

Another advantage of the control function of the electric contact switch is the decreased response time of the parking brake because a bleeding only has to still take place starting from the release pressure and no longer starting from the full operating pressure level. This eliminates the time for reducing the pressure difference, which is advantageous particularly in driving situations which require a fast responding of the parking brake, which applies, for example, when stopping on a hill during stop-and-go driving or during an emergency braking by means of the emergency brake. The effect is an increase in driving comfort and traffic safety.

Finally, another advantage of the invention is a saving of costs for the braking system because the low additional expenditures for using the electric switch are offset by a clear cost reduction as a result of the elimination of the pressure switch. Furthermore, because of the reduced pressure level in the spring-loaded cylinder, a correspondingly adapted smaller dimensioning of different components of the spring-loaded cylinder can take place, which results in additional savings with respect to cost and weight.

According to a preferred embodiment of the invention, at least one duct for receiving the conductor lines to the contact switch is provided in the release screw. As a result, the lines from the contact switch can extend in a protected manner and do not require a separate space.

Contact elements connected with the contact switch are preferably provided on a section of the release screw projecting out of the housing, which contact elements can be contacted by means of a plug. This permits a fast operation of the emergency release device after the withdrawal of the plug, and the connection to the switch or the switches can be established in a simple manner.

According to another embodiment, a contact switch may be provided for detecting the position of the piston at a narrow spacing from the withdrawn position which completely releases the brake. Such an adjustment of the switch may take place, for example, at approximately 10 to 20 mm in front of the withdrawn position. This contact switch will then detect an operating condition in which, during a release operation, the brake linings just barely no longer rest against the brake disk or, during a braking operation, do not quite yet rest against the brake disk and thus no braking torque is present. The further release stroke of the piston to the withdrawn position will then be necessary in order to provide the full release play between the disk and the brake linings. A switch adjustment to the above-mentioned value permits the obtaining of a switch signal which is emitted as close to the time of the functional release or the start of the effect of the brake. By means of this signal, for example, an electronic control can be supplied, which then assists the starting on a hill or the "hill holder" function. In this further development, a switch with two switching positions can also be used, which emits a signal in the completely withdrawn position as well as in the spaced position of the piston.

A proximity switch can also be used which responds at a defined spacing of the triggering components.

According to another embodiment, the release screw comprises a thickened release screw head at the end side. At the ring-shaped side of the release screw head facing the release screw, a contact switch is provided for detecting the engagement of the release screw head with the piston. A contact switch arranged in this manner forms a stationary point of reference for the detection of the position of the piston as well as for the release nut moving on the screw. In this case, two switches may be used, one being arranged between the head of the release screw and an inner face of an element fixed to the spring-loaded piston tube, while the other is arranged between the release nut and the circular face of the release screw head. In this manner two separate signals can be received—one for the release position of the piston and the second signal for the driving operation position when the emergency release system is activated.

The contact switch may also be installed at the bottom of the cylinder body so that the contact switch is actuated in the completely withdrawn position of the piston.

Further, the contact switch may also be mounted on a piston rod which is arranged between the spring-loaded piston and the brake lever and forms a unit with the latter, because it is constantly held in a pressed manner against the piston.

Other objects, advantages and novel features of the present invention will become apparent from the following detailed description of the invention when considered in conjunction with the accompanying drawings.

DETAILED DESCRIPTION OF THE DRAWINGS

Figure 1:
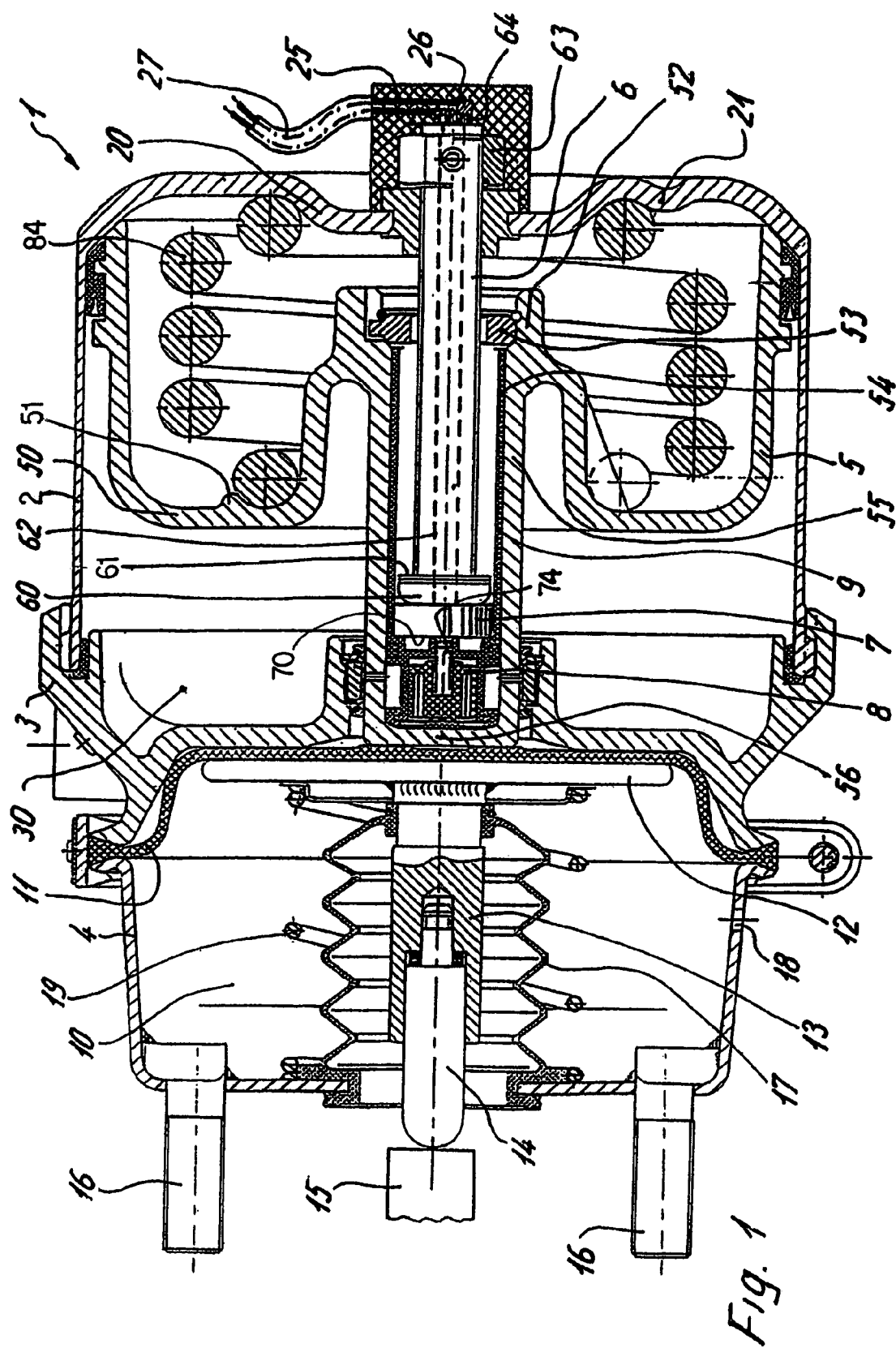
FIG. 1 is a sectional lateral view of an embodiment of a spring-loaded cylinder according to the invention.

A spring-loaded cylinder 1 comprises a first housing part 2, a second central housing part 3 and third housing part 4. In the first housing part 2, a spring 84 is accommodated which is supported at one side on the housing 2 and rests on a piston 5 on the opposite side. For receiving the spring 84, the piston 5 comprises a U-shaped section 50 in which profilings 51 are provided for the form-locking receiving of the spring coil which is arranged last at the end side. On the opposite side, the housing 2 also comprises profilings 20 and 21 for receiving the other end-side spring coil. In the space formed between the housing parts 2 and 3, as well as the piston 5, a primary chamber 30 of the parking brake part is provided, which can be acted upon by pressure.

Inside the piston 5, a release screw 6 is arranged. The release screw 6 has a release screw head 60 which, on an exterior face thereof, rests against a contact switch 7. The contact switch 7 comprises a contact switch head 70 which is connected by way of a plunger 74 with a threaded section 75. The threaded section 75 is screwed into a stop 8 in the form of an internal ventilation (bleeding) for the piston 5. By way of a sealing device or sliding guide, the contact switch head may be partially accommodated in the release screw head 60 (see FIG. 2). In the illustrated position, a first contact point and a second contact point rests against the contact switch head 70, which has conductive connections and can thus close a control circuit.

The release screw 6 is accommodated in a tube-shaped section 55 of the piston 5 in which a piston tube 54 is fixed. The piston 5 comprises a holding section 52, in which a blocking element 53 is mounted in order to fix the piston tube 54 and in order to form a stop for the back side of the release screw head 61. The piston 5 can move maximally from the withdrawn position with the stroke position 0 illustrated in FIG. 1, in which the release screw head 60 rests against the contact switch 7, toward the left until the face of section 50 rests on the facing face of the housing part 3.

By means of a face 56, the piston 5 presses onto a membrane 11 which is fixed between the center housing part 3 and the housing part 4. In the space formed between the housing 4 and the membrane 11, a secondary chamber 10 (primary chamber of the service brake part) is provided, in which a piston rod 13 is accommodated which rests against the membrane 11 by means of a plate 12. A pressure piece 14 is mounted on the piston rod 13, which pressure piece 14 presses by means of a face side onto a brake lever 15, which is not shown in detail. Thus, as a result of a movement of the piston 5, by means of the membrane 11, the plate 12, the piston rod 13 as well as the pressure piece 14, the brake lever 15 can be operated, which is pretensioned toward the pressure piece 14. In this case, the housing part 4 is fixed by means of stud bolts 16 on a caliper (which is not shown).

Bellows 17 are fixed in the housing part 4 between the face side of the housing 4 facing the brake lever 15 and on opposite side of the piston rod 13 adjacent to the plate 12 in order to seal off the secondary chamber 10. The secondary chamber 10 can be acted upon by pressure by way of a ventilation, which is not shown, for operating the service brake. The secondary chamber 10 is connected with the ambient air by way of an opening 18. In the mounted condition, the plate 12 of the piston rod 13 is pretensioned by way of a spring 19 into the illustrated position.

In the representation of FIG. 1, the primary chamber 30 is acted upon by pressure via a ventilation which is not shown. As a result, the piston 5 is in the withdrawn position, in which the face of the release screw head 60 rests against the contact switch 7. A circuit is thereby switched in the contact switch 7 and a signal is generated, which signal is transmitted to contact pins 64 by way of lines 62 arranged in the release screw 6. The contact pins 64 engage with contact elements 26 of a plug 25, which is fitted onto a release nut 63. The signals of the contact switch 7 are then transmitted by way of a line 27 to a control unit, which is not shown, of a braking system of a vehicle.

For the application of the parking brake, the pressure is lowered in the primary chamber 30 until the force of the spring 84 is greater than the pressure in the primary chamber 30 acting upon the piston 5. As a result, the piston 5, together with the membrane 11 of the piston rod 13 and the pressure piece 14, is moved toward the brake lever 15, which provides a braking force after overcoming the release play. For releasing the parking brake, pressure is built up in the primary chamber 30 until the piston 5 moves back into the withdrawn position. As soon as the contact switch 7 rests against the face of the release screw head 60, a signal is emitted, which signals the ready driving position. As a result, on the one hand, a further pressure buildup in the primary chamber 30 can be switched off since the end position has already been reached and, by way of controlling the system, the driver is informed that the vehicle is ready to be driven.

If, as a result of a defect, for example, since sufficient pressure cannot be built up in the primary chamber 30, a release of the brake cannot take place, after the withdrawal of the plug 25, the release nut 63 can be operated so that the release screw 6 can be rotated toward the outside. In this case, the ring-shaped surface 61 is applied to the blocking element 53 and, in this manner, pulls the piston 5 into the withdrawn position. Although, when the emergency release system is activated, the piston 5 is moved into the withdrawn position, no signal is emitted by way of the contact switch 7 because the release screw head 60 does not rest against the contact switch 7. As a result, it can be signalled to the driver that the emergency release system is activated at the spring-loaded cylinder 1 and the damage has to be eliminated as fast as possible.

In the illustrated embodiment, the contact switch 7 is arranged between the release screw head 60 and the bleeding device 8. It is also conceivable to install the switch in the bottom of the housing part 2 which is actuated by the receiving end 50 of the piston 5.

Furthermore, several switches can be provided in order to detect different operating positions of the piston 5. As illustrated, a switch can be installed between the release screw head 60 and the interior face 56 of the spring-loaded piston tube, while the other switch is arranged between the release nut 63 and the circular face 61 of the release screw head 60. In this manner, two separate signals can be received—one for the release position of the spring-loaded piston and the second signal for the driving operation position of the release nut 63. By means of corresponding additional expenditures for a third switch at the cylinder bottom, it is also possible to monitor the other end position of the release nut 63 in the not fully emergency-released operating case.

Figure 2:
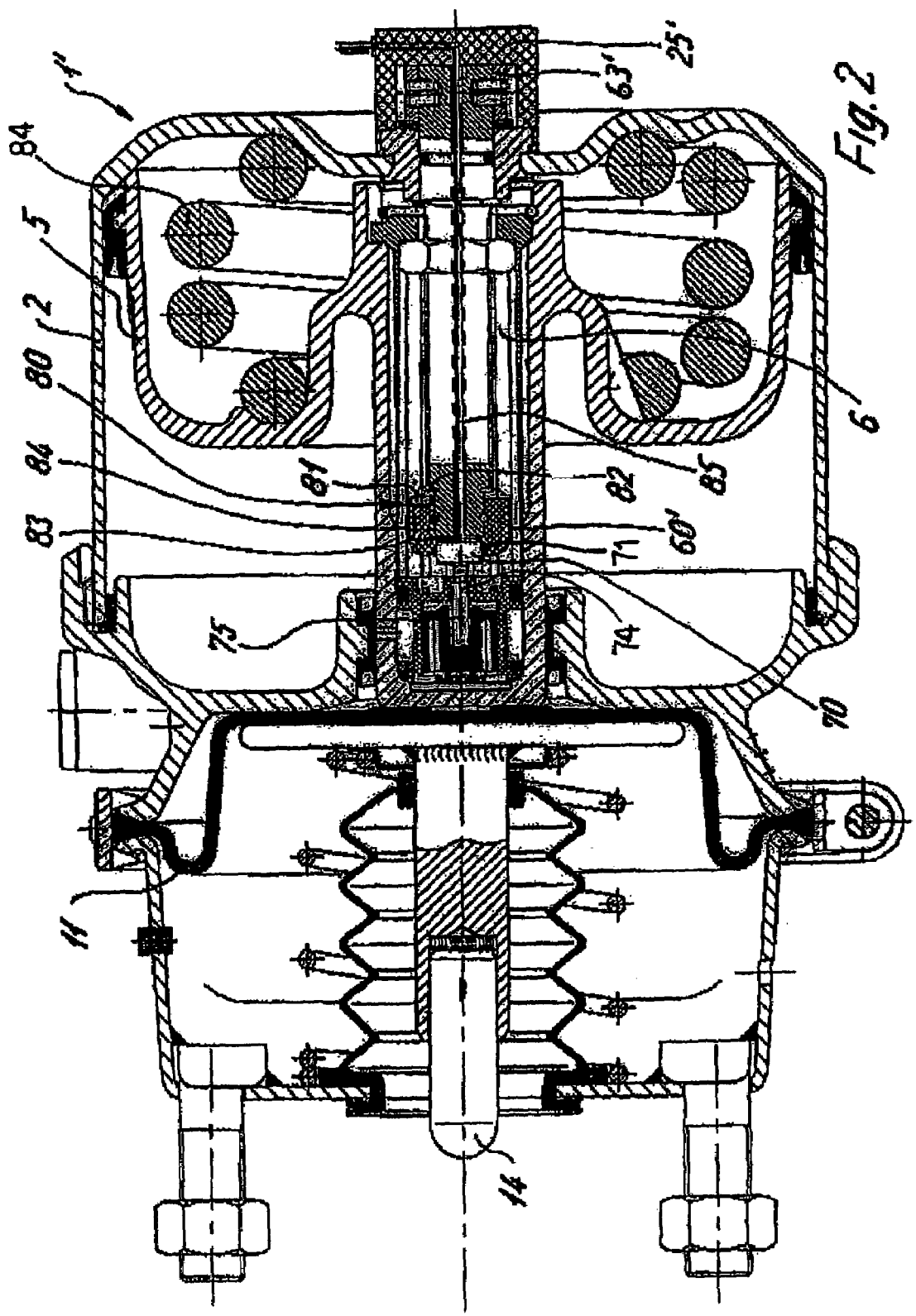
FIG. 2 is a sectional lateral view of an embodiment modified in comparison to FIG. 1.
Figure 3:
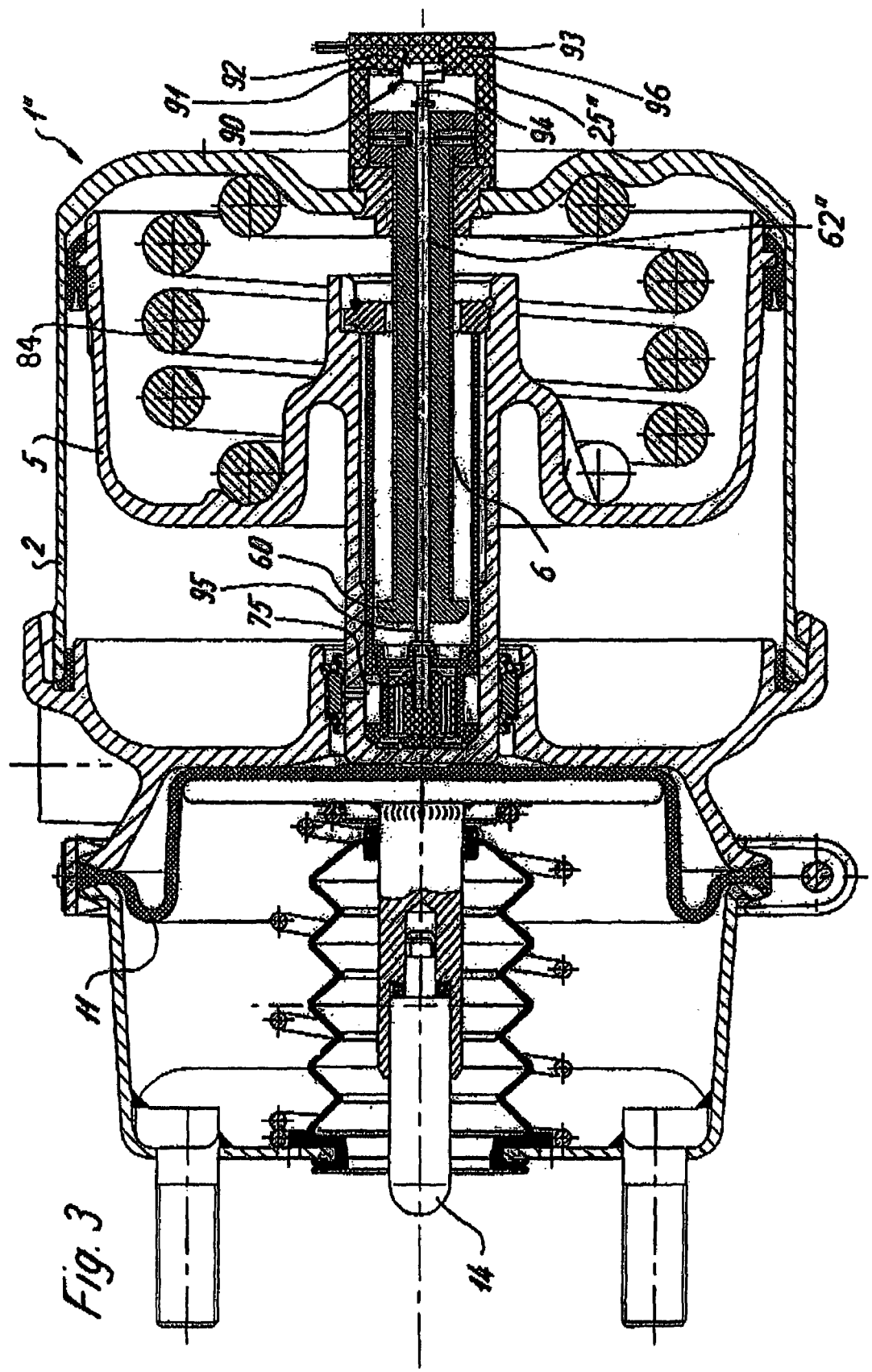
FIG. 3 is a sectional lateral view of another embodiment of a spring-loaded cylinder according to the invention.

FIGS. 2 and 3 show two additional embodiments of a spring-loaded cylinder according to the invention, where identical components have the same reference number and only the modifications in comparison with the first embodiment are described in detail.

In the case of the spring-loaded cylinder 1' illustrated in FIG. 2, a first contact switch 7 is provided which, as in the preceding embodiment, comprises a contact switch head 70 which is partially accommodated in the release screw head 60'. A second contact switch 80, which has a switch head 81, is also mounted on the release screw head 60'. This switch head 81 is arranged between a snap ring 83 and a back side of the release screw head 60'. The second contact switch 80 can emit a signal when the back side of the release screw head 60' rests against the second switch head 81, lines 83 and 84 being arranged in the release screw head 60', in order to be able to establish a corresponding electrical connection. In this case, the second contact switch 80 detects a position when the piston 5 has been displaced approximately by one rotation of the screw, so that the driving position can be signalled in this manner. The second contact switch 80 is thus provided at a certain distance from the withdrawn position, so that the position of the piston 5 is detected at which the brake has given up its effect and the release play has been overcome. In order to limit the constructional expenditures, the lines for the contact switches 7 and 80 are accommodated in a common bore 85 which extends through the release screw 6. A covering 25', which reaches over an adjustable release nut 63', is provided on the opposite side of the release screw 6.

In another embodiment illustrated in FIG. 3, a contact switch 90 with a switch head 96 is mounted on the exterior side of the spring accumulator in the area of a plug 25". The switch head 96 is accommodated in the plug 25, in which case a sealing ring or a sliding element 91 is provided laterally. On the side facing away from the release screw 6, two contact points 92 and 93 are provided with which the switch head 96 interacts in order to close a control circuit. The contact switch 90 is operated by way of a rod 95 at whose one end a holder 94 for the switch head 96 is provided. In this case, the rod 95 is displaceably guided through a duct 62" in the release screw 6. When the withdrawn position of the piston 5 has been reached, the rod 95 is moved through the piston 5 and thus the contact switch 90 is operated which is situated on the outside. In this variant, the contact switch 90 may also be integrated in the plug housing or may be combined in another advantageous manner with the plug to form a preferably hermetically sealed functional unit. In addition, other positions of the piston 5 can also be detected by way of such an external switch.

The precision of the switching signal with respect to the reaching of the release position (or a defined stroke position) of the spring-loaded piston is influenced by the dimensional accuracy of the components, which determine the position of the faces of the spring-loaded piston tube and the release screw head 63 relative to one another. In order not to have to limit the manufacturing tolerances of these components in a cost-increasing manner, it is advantageous to provide an adjusting possibility of the triggering of the signal.

During the assembly of the spring accumulator parts, at the end, the release nut 63 is usually screwed onto the free thread end of the release screw 6. The two components are then pinned together; that is, by making a transverse hole through the two mutually screwed-together parts, in which a pin or the like is then inserted, these are fixed relative to one another. This pinning-together can be utilized for adjusting the illustrated contact switch.

For this purpose, the piston 5 is placed in the release position by the admission of pressure. The release screw 6 is partially or completely unscrewed from the housing 2. The release screw 6 is subsequently screwed into the section 55 of the piston 5 until the contact switch responds. The response of the contact switch can be indicated by way of a tension source and a testing device. The thus determined position of the release screw 6 will then be fixed, for example, by means of pinning together, in that the release nut 63 is screwed onto the release screw 6 up to the stop and subsequently the pinning-together takes place.

The adjusting operation for the signal triggering of the contact switch can also take place in an automated manner in that the switch for the automated screw driver is supplied directly with the switch-off signal of the contact switch.

Other adjusting methods for the signal triggering of the contact switch can also be used.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

Table of Reference Numbers

| | |
|---|---|
| 1 | Spring-loaded cylinder |
| 2 | first housing part |
| 3 | second housing part |
| 3' | third housing part |
| 4 | spring |
| 5 | piston |
| 6 | release screw |
| 7 | contact switch |
| 8 | stop |
| 9 | sleeve |
| 10 | secondary chamber |
| 11 | membrane |
| 12 | plate |
| 13 | piston rod |
| 14 | pressure piece |
| 15 | brake lever |
| 16 | stud bolt |
| 17 | bellows |
| 18 | opening |
| 19 | spring |
| 20 | profiling |
| 21 | profiling |
| 25 | plug |
| 26 | contact element |
| 27 | line |
| 30 | primary chamber |
| 50 | receiving device |
| 51 | profiling |
| 52 | holding section |
| 53 | blocking element |
| 54 | piston tube |
| 55 | tube-shaped section |
| 56 | face |
| 60 | release screw head |
| 61 | back side release screw head |
| 62 | line |
| 63 | release nut |
| 64 | contact pin |
| 70 | switch head |
| 71 | sealing device |
| 72 | first contact point |
| 73 | second contact point |
| 74 | plunger |
| 75 | threaded section |
| 80 | contact switch |
| 81 | switch head |
| 82 | snap ring |
| 83 | line |
| 84 | line |
| 85 | bore |
| 90 | contact switch |
| 91 | sealing device |
| 92 | first contact point |
| 93 | second contact point |
| 94 | holder |
| 95 | plunger |
| 96 | switch head |

What is claimed is:

1. A spring-loaded cylinder for generating braking forces for an emergency and parking brake effect, comprising:
   a cylinder housing;
   a piston arranged in the housing, which piston is movable for operating a brake lever and which is pretensioned via a spring toward the brake lever when installed;
   a release screw operable to move the piston from an extended position operating the brake lever in a braking position against a force of the spring into a withdrawn position releasing the braking position;
   a primary chamber arranged in the cylinder housing, which chamber is adapted to be acted upon by pressure and, when a response pressure of the piston is exceeded, moves the piston against the force of the spring into the withdrawn position; and
   at least one electrical contact switch provided between the release screw and the piston, which detects a position of the piston in the cylinder housing.

2. The spring-loaded cylinder according to claim 1, wherein the withdrawn position of the piston is detectable via the contact switch.

3. The spring-loaded cylinder according to claim 1, wherein the release screw comprises a release screw head arranged in a tube section of the piston, and further wherein said contact switch is provided at an exterior face of the release screw head for detecting the withdrawn position of the piston.

4. The spring-loaded cylinder according to claim 2, wherein the release screw comprises a release screw head arranged in a tube section of the piston, and further wherein said contact switch is provided at an exterior face of the release screw head for detecting the withdrawn position of the piston.

5. The spring-loaded cylinder according to claim 1, wherein at one end side the release screw includes a thickened release screw head and, at an opposite side of the release screw head facing the release screw, a further contact switch is provided for detecting an engagement of the release screw head with the piston.

6. The spring-loaded cylinder according to claim 2, wherein at one end side the release screw includes a thickened release screw head and, at an opposite side of the release screw head facing the release screw, a further contact switch is provided for detecting an engagement of the release screw head with the piston.

7. The spring-loaded cylinder according to claim 1, wherein the release screw is provided with at least one duct for receiving signal lines for the contact switch.

8. The spring-loaded cylinder according to claim 2, wherein the release screw is provided with at least one duct for receiving signal lines for the contact switch.

9. The spring-loaded cylinder according to claim 3, wherein the release screw is provided with at least one duct for receiving signal lines for the contact switch.

10. The spring-loaded cylinder according to claim 5, wherein the release screw is provided with at least one duct for receiving signal lines for the contact switch.

11. The spring-loaded cylinder according to claim 7, wherein at a section of the release screw projecting out of the cylinder housing, contact elements are provided which couple with the contact switch and are adapted to be contacted via a plug.

12. The spring-loaded cylinder according to claim 1, wherein a further contact switch is provided for detecting a position of the piston at a narrow spacing from the withdrawn position in which the braking position is released.

13. The spring-loaded cylinder according to claim 1, wherein a plurality of contact switches for detecting the position of the piston are provided on the cylinder housing.

14. The spring-loaded cylinder according to claim 2, wherein a plurality of contact switches for detecting the position of the piston are provided on the cylinder housing.

15. The spring-loaded cylinder according to claim 3, wherein a plurality of contact switches for detecting the position of the piston are provided on the cylinder housing.

16. The spring-loaded cylinder according to claim 5, wherein a plurality of contact switches for detecting the position of the piston are provided on the cylinder housing.

17. The spring-loaded cylinder according to claim 1, further comprising:

a membrane upon which the piston is pressed via the spring; and a piston rod having a pressure piece which presses against the brake lever, the piston rod being pressed via the membrane.

18. The spring-loaded cylinder according to claim 1, wherein one of said at least one contact switch is arranged at or in an external plug, and wherein said one contact switch is operable by way of a pin provided in the release screw.

19. The spring-loaded cylinder according to claim 1, wherein signal triggering of the contact switch is adjustable relative to a defined stroke position of the piston or of the release screw.

20. The spring-loaded cylinder according to claim 1, wherein the contact switch includes a switch head interacting with contact points in order to make available an electric line in case of a contact operation.

21. A spring-loaded cylinder for parking and emergency braking functions, comprising:

a housing in which a piston is arranged, said piston being movable for operating the braking functions;

a spring having a spring force, the spring being arranged to pretension the piston so as to operate the braking functions;

a release screw adapted to move the piston from an extended position in which the braking functions are operated against the spring force into a withdrawn position releasing the braking functions; and at least one electrical contact switch arranged between the release screw and the piston, the electrical contact switch detecting a position of the piston within the housing.

22. The spring-loaded cylinder according to claim 21, wherein the release screw includes a screw head arranged in a tubular section of the piston, wherein the contact switch is arranged at an exterior face of the screw head such that the withdrawn position of the piston is determinable.

23. The spring-loaded cylinder according to claim 21, wherein a further contact switch is provided on an underside of a screw head facing the release screw, said further contact switch being adapted to detect an engagement of the screw head with the piston.

24. The spring-loaded cylinder according to claim 22, wherein a further contact switch is provided on an underside of the screw head facing the release screw, said further contact switch being adapted to detect an engagement of the screw head with the piston.

* * * * *